US008667315B2

(12) United States Patent
Agata

(10) Patent No.: US 8,667,315 B2
(45) Date of Patent: Mar. 4, 2014

(54) SYNCHRONIZATION CONTROL APPARATUS, INFORMATION PROCESSING APPARATUS, AND SYNCHRONIZATION MANAGEMENT METHOD FOR MANAGING SYNCHRONIZATION BETWEEN A FIRST PROCESSOR AND A SECOND PROCESSOR

(75) Inventor: Masashi Agata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1191 days.

(21) Appl. No.: 12/569,333

(22) Filed: Sep. 29, 2009

(65) Prior Publication Data
US 2010/0088535 A1    Apr. 8, 2010

(30) Foreign Application Priority Data
Oct. 3, 2008    (JP) .................................. 2008-258728

(51) Int. Cl.
*G06F 1/12* (2006.01)
(52) U.S. Cl.
USPC ............ 713/375; 713/300; 713/400; 713/500
(58) Field of Classification Search
USPC .................................. 713/300, 375, 400, 500
See application file for complete search history.

(56) References Cited

U.S. PATENT DOCUMENTS

| 3,681,578 | A | * | 8/1972 | Stevens ............................ 714/11 |
| 3,810,119 | A | * | 5/1974 | Zieve et al. .................... 713/375 |
| 5,222,229 | A | * | 6/1993 | Fukuda et al. ................. 713/375 |
| 5,353,436 | A | * | 10/1994 | Horst ............................. 713/375 |
| 6,393,582 | B1 | | 5/2002 | Klecka et al. |
| 7,426,656 | B2 | | 9/2008 | Bernick et al. |
| 2006/0133410 | A1 | * | 6/2006 | Yoshida ........................ 370/452 |
| 2006/0245264 | A1 | | 11/2006 | Barr et al. |

FOREIGN PATENT DOCUMENTS

| EP | 1 380 953 | 1/2004 |
| JP | 2005-285119 | 10/2005 |
| JP | 2006-302289 | 11/2006 |
| JP | 2008-46942 | 2/2008 |

OTHER PUBLICATIONS

Korean Office Action issued Oct. 25, 2011 in Korean Patent Application No. 2009-93924.
Japanese Office Action issued Mar. 5, 2013 in corresponding Japanese Application No. 2008-258728.

* cited by examiner

*Primary Examiner* — Kim Huynh
*Assistant Examiner* — Zahid Choudhury
(74) *Attorney, Agent, or Firm* — Staas & Halsey LLP

(57) ABSTRACT

A synchronization control apparatus includes a counter that carries out a counting and outputs resulting count information, a timeout time holder that holds a predetermined timeout time and outputs the timeout time, a comparator that compares the count information output from the counter and the timeout time output from the timeout time holder, a synchronization controller that monitors a synchronization between a first processor and a second processor by comparing an output from the first processor and an output from the second processor and starts a counting, when a mis-match of the outputs from the first processor and the second processor is detected and wherein the comparator detects that the count information and the timeout time match, the comparator stops either the first processor or second processor in which a synchronization delay has occurred.

7 Claims, 7 Drawing Sheets

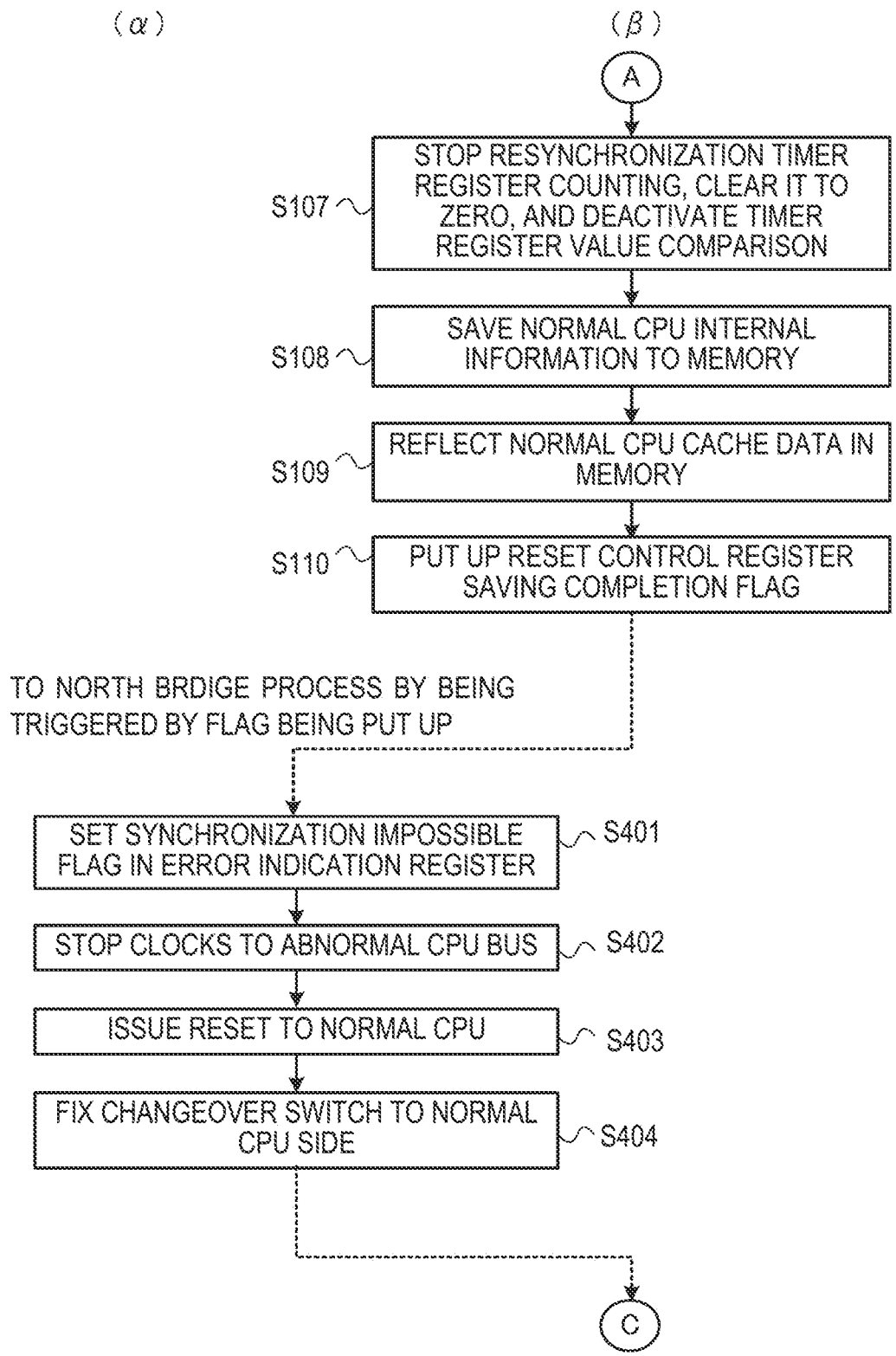

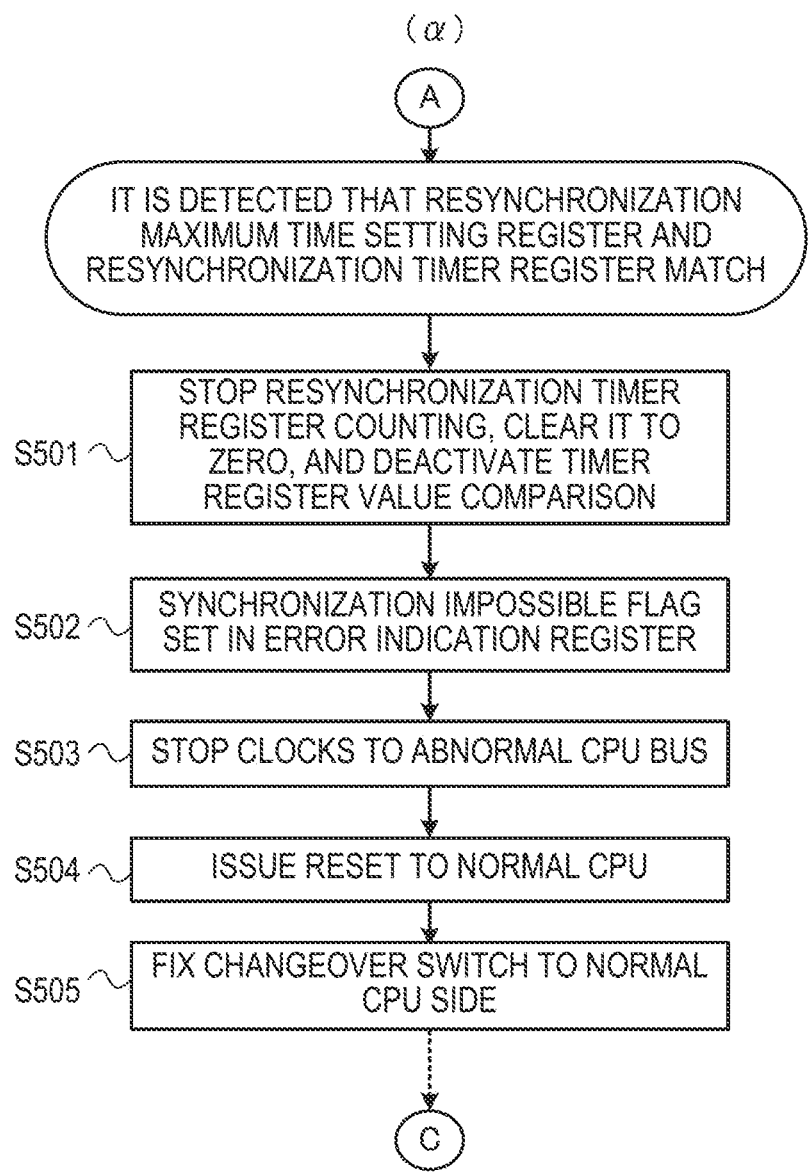

SYNCHRONIZATION CONTROL APPARATUS, INFORMATION PROCESSING APPARATUS, AND SYNCHRONIZATION MANAGEMENT METHOD FOR MANAGING SYNCHRONIZATION BETWEEN A FIRST PROCESSOR AND A SECOND PROCESSOR

CROSS-REFERENCE TO RELATED APPLICATIONS

This application is based upon and claims priority to prior Japanese Patent Application No. 2008-258728 filed on Oct. 3, 2008 in the Japan Patent Office, the entire contents of which are incorporated herein by reference.

BACKGROUND

1. Field

The present invention relates to a synchronization control apparatus, an information processing apparatus, and a synchronization management method.

2. Description of the Related Art

In a current large-scale and mission-critical server system, it is known that a hardware configuration is made redundant so that the whole of the system is not stopped due to a hardware fault or the like. For this reason, regarding a CPU (Central Processing Unit) too, a redundant CPU technology has been developed in which a plurality of CPU's of the same configuration are embedded in the system in advance. Two CPU's are always caused to implement the same process simultaneously, and a result of the process from an optional CPU is output to the exterior. In the event that either CPU goes wrong, the wrong CPU is separated from the system, while the one remaining normal CPU is caused to continue the process, and a result of the process from the normal CPU is output to the exterior.

Naturally, there may be a case in which only a process executed by one CPU is delayed or hangs due not to a hardware fault but to a software error, thereby causing a synchronization delay between the plurality of CPU's. In such a case, there may be a case in which it is possible, depending on a degree of the error, to restore a condition in which the two CPU's are synchronized with each other (that is, a redundant configuration) by once stopping a CPU in which an abnormality has occurred, and reproducing (initializing) internal information of a normal CPU in the former.

Therefore, there is a need for a synchronization control apparatus which monitors an existence or otherwise of a synchronization delay between the two CPU's, and executes and retries a resynchronization process which, in the event that a synchronization delay has occurred, resynchronizes a CPU in which a failure has occurred by resetting and initializing it.

[Patent Document 1] Japanese Laid-open Patent Application No. 2006-302289

[Patent Document 2] Japanese Laid-open Patent Application No. 2005-285119

SUMMARY

According to an aspect of the invention, a synchronization control apparatus includes a counter that carries out a counting and outputs resulting count information, a timeout time holder that holds a predetermined timeout time and outputs the timeout time, a comparator that compares the count information output from the counter and the timeout time output from the timeout time holder, a synchronization controller that monitors a synchronization between a first processor and a second processor by comparing an output from the first processor and an output from the second processor and starts a counting, when a mis-match of the outputs from the first processor and the second processor is detected and wherein the comparator detects that the count information and the timeout time match, the comparator stops either the first processor or second processor in which a synchronization delay has occurred.

The above-described embodiments of the present invention are intended as examples, and all embodiments of the present invention are not limited to including the features described above.

BRIEF DESCRIPTION OF THE DRAWINGS

FIG. 5 is a flowchart depicting the details of the resynchronization process; and FIG. 6 is a flowchart depicting the details of the resynchronization process.

DETAILED DESCRIPTION OF THE PREFERRED EMBODIMENTS

Figure 1:
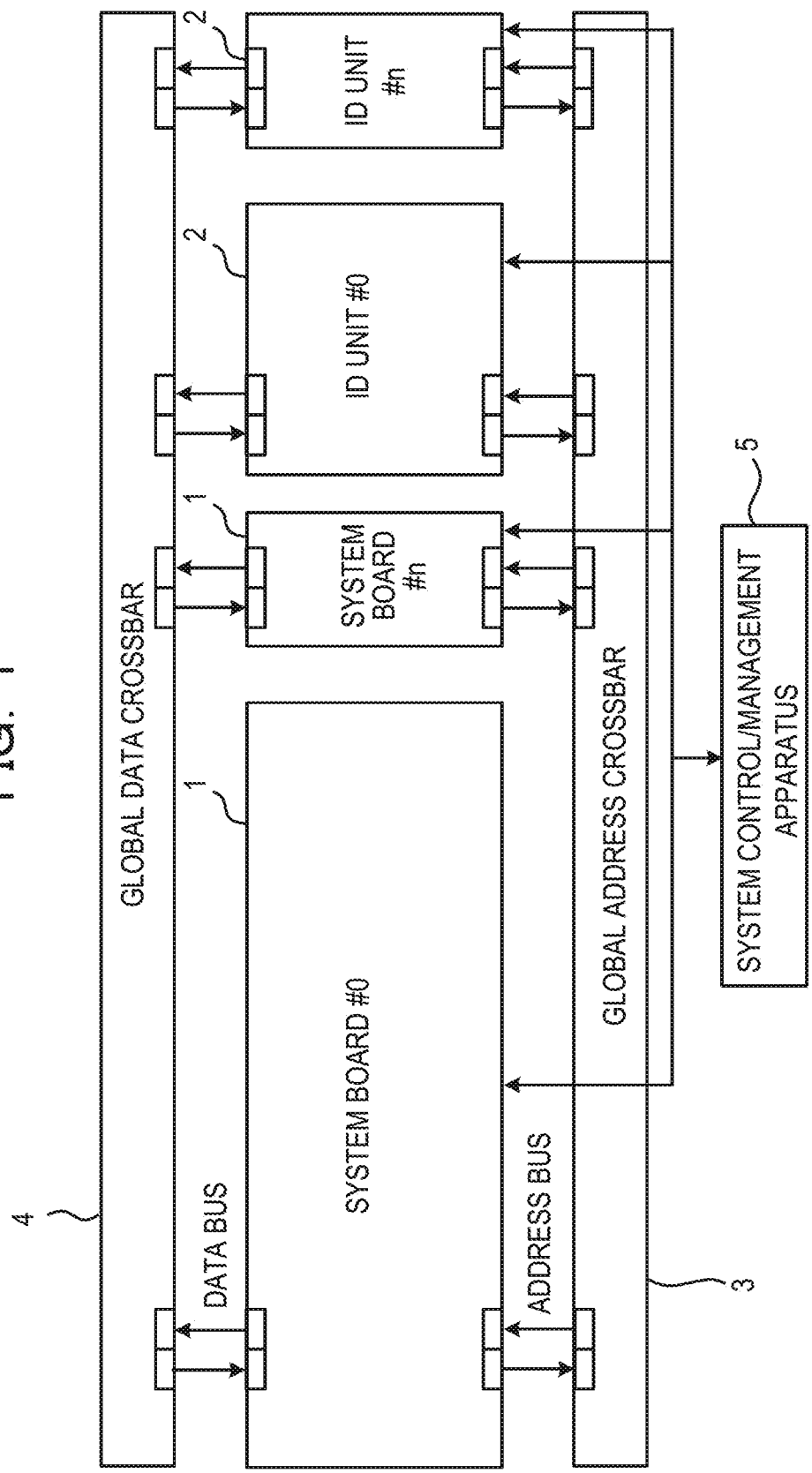
FIG. 1 is a block diagram depicting an outline configuration of a server system.

Reference may now be made in detail to embodiments of the present invention, examples of which are illustrated in the accompanying drawings, wherein like reference numerals refer to like elements throughout.

Hereafter, based on the drawings, a description will be given of a server system which is an embodiment of a disclosed information processing apparatus.

Firstly, a description will be given, referring to the block diagrams of FIGS. 1 to 3, of a hardware configuration of the server system.

FIG. 1 is a block diagram depicting an example configuration of the server system. As depicted in FIG. 1, the server system is realized as a multiprocessor system including a plurality of system boards (#0 to #n) 1. The plurality of system boards (#0 to #n) 1 are mutually connected through a global address crossbar 3 and global data crossbar 4. Furthermore, the global address crossbar 3 and global data crossbar 4 are also connected to a plurality of 10 units (#0 to #n) 2 corresponding to the system boards (#0 to #n) 1 with the same plurality of serial numbers (#0 to #n).

The global address crossbar 3 is an address relay unit which relays a command issued from each system board (#0 to #n) 1, and an address which is an object of the command, to another system board (#0 to #n) 1 and IO unit (#o to #n) 2.

Also, the global data crossbar 4 is a processing unit which relays data between the system boards (#0 to #n) 1, between the IO units (#0 to #n) 2, and between the system boards (#0 to #n) 1 and IO units (#0 to #n) 2.

Furthermore, a system control/management apparatus 5 is connected to the system boards (#0 to #n) 1 and IO units (#0 to #n) 2. The system control/management apparatus 5 is a service processor or console apparatus which, in accordance with a control signal input by a system manager, carries out an overall management, such as a setting of various kinds of setting value in a register group (the details of which will be described hereafter based on FIGS. 2 and 3) included in each system board (#0 to #n) 1 and IO unit (#0 to #n) 2, and a setting of a configuration of a partition. The partition is a system configured by a combination of the system boards (#0 to #n) 1 and IO units (#0 to #n) 2.

Figure 2:
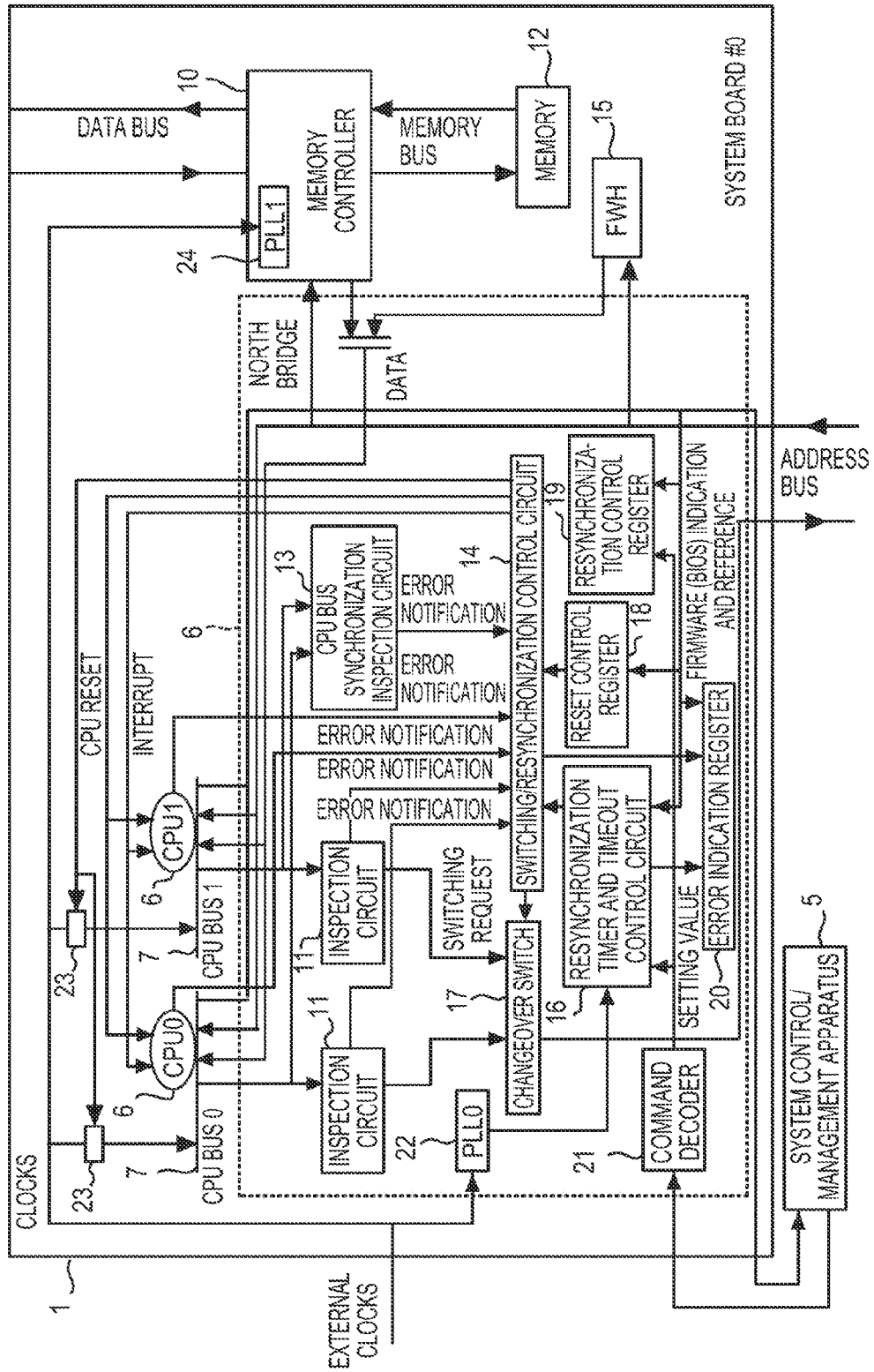
FIG. 2 is a block diagram depicting a circuit configuration on a system board.

FIG. 2 is a block diagram depicting a circuit configuration mounted on each system board (#0 to #n) 1. As depicted in FIG. 2, a CPU0 6 acting as a first processor, and a CPU1 6 acting as a second processor are installed on the system board 1 in a condition in which they are connected to corresponding CPU bus0 7 and CPU bus1 7. The CPU0 6 and the CPU1 6 are a pair of CPU's made redundant (redundant CPU's) which, as well as having the same configuration, are operated in synchronization.

The information processing apparatus configured of the multiprocessor (redundant CPU) system mounted on the system board 1 is comprised of the plurality of CPUs of CPU0 6 and CPU1 6 and a plurality of buses of CPU bus0 7 and CPU bus1 7, clock control circuits 23 and 23, a firmware hub 15, a north bridge 6, a memory 12, and a memory controller 10. The command and address notified of from the global address crossbar 3 are input into each CPU0 6 and CPU1 6 through each CPU bus0 7 and CPU bus1 7, as well as being input into the firmware hub 15 and memory controller 10.

The clock control circuits 23 and 23 to pass through, or block them, are controlled by a switching/resynchronization control circuit 14, to be described hereafter, in the north bridge 6. The clock control circuits 23 and 23 are switches which allow clocks (external clocks acting as first clocks), supplied to the CPU bus0 7 and the CPU bus1 7 from a not depicted clock generation device provided outside the system board 1, to pass through, or block them. The CPU0 6 and the CPU1 6 which, being connected to the CPU bus0 7 and CPU bus1 7, are prevented by the clock control circuits 23 from being supplied with the clocks, become inoperative, and degenerate because the clocks are not input thereinto.

The firmware hub 15 is connected to each CPU0 6 and CPU1 6 for such a reading. The firmware hub 15 is a non-volatile flash memory storing firmware (e.g. BIOS (Basic Input Output System)) which is read first when each CPU0 6 and CPU1 6 is subjected to a CPU reset or interrupt, as heretofore described. Each CPU0 6 and CPU1 6, in accordance with the firmware, executes a resynchronization process; that is, an interrupt process (the "normal CPU interrupt firm process" depicted in FIGS. 4 and 5) in the event that it is subjected to the interrupt by the north bridge 6 (the switching/resynchronization control circuit 14), to be described hereafter. Each CPU0 6 and CPU1 6 also executes an initial process (the "reset firmware initial process" depicted in FIGS. 4A and 4B) in the event that it is subjected to the reset.

Also, the memory controller 10 executes a write process which writes data input from the global data crossbar 4 into a storage position of the memory 12 indicated by the input address. The memory controller 10 is connected to the memory 12 in which various kinds of data are stored. The memory controller 10 also executes a read process which reads data retrieved from the storage position, and sends them to the global data crossbar 4 or each CPU0 6 and CPU1 6.

Next, the north bridge 6 detects that a failure and degeneration has occurred, causing a synchronization break, in one CPU (one module CPU) of the CPU0 6 and the CPU1 6 configuring the redundant CPU's. The north bridge 6 is a circuit group which corresponds to a synchronization control apparatus. The north bridge 6 carries out a redundant CPU resynchronization process in synchronization with a CPU0 6 or a CPU1 6 operating in accordance with the firmware stored in the firmware hub 15.

Herein, the "synchronization break", referring to the fact that the pair of CPU's configuring the redundant CPU's cannot be operated in synchronization, originates with a "synchronization delay". In a synchronization delay, the process executed by one CPU0 6 or CPU1 6 lags behind the process executed by the other CPU0 6 or CPU1 6. Also, the "redundant CPU resynchronization process" is a process for returning both the CPU0 6 and the CPU1 6 to a redundant configuration again. As the north bridge 6 is configured of hardware which operates independently of the CPU0 6 and the CPU1 6, it is possible to execute such a redundant CPU resynchronization process without causing a shutdown/restart of an OS operating on the system.

In FIG. 2, inspection circuits 11 and 11, a CPU bus synchronization inspection circuit 13, the switching/resynchronization control circuit 14, a resynchronization timer and timeout control circuit 16, a changeover switch 17, a reset control register 18, a resynchronization control register 19, an error indication register 20, a command decoder 21, and a phase synchronization circuit (PLL0) 22, which are surrounded by the broken line, configure the north bridge 6. Hereafter, a description will be given of a function of each of these circuits configuring the north bridge 6.

Firstly, the command decoder 21 decodes a command issued from the system control/management apparatus 5 to the north bridge 6. The command decoder 21 then carries out a writing/reading of setting values with respect to the resynchronization control register 19 and the resynchronization timer and timeout control circuit 16 (a resynchronization maximum time setting register 163) in accordance with a result of the decoding.

The inspection circuits 11 and 11, being connected to the output terminals of the CPU0 6 and the CPU1 6 through the corresponding CPU bus0 7 and CPU bus1 7, receive packets transmitted from the CPU0 6 and the CPU1 6 toward the global address crossbar 3, and carry out an inspection of an ECC (Error Checking and Correcting), a parity, and the like. The inspection circuits 11 and 11 give an error notification to the switching/resynchronization control circuit 14 upon detecting an error by means of the inspection.

The CPU bus synchronization inspection circuit 13, being connected to the CPU bus0 7 and the CPU bus1 7, carries out a synchronization inspection for each CPU bus. That is, the CPU bus synchronization inspection circuit 13 inspects for whether or not the CPU pair configuring the redundant CPU's are carrying out a synchronized operation. Then, the CPU bus synchronization inspection circuit 13 gives an error notification to the switching/resynchronization control circuit 14 upon detecting a desynchronization.

In the event that an error is detected inside a CPU0 6 or a CPU1 6, the CPU0 6 or the CPU1 6 in which the error has been detected gives an error notification (an internal error notification) to the switching/resynchronization control circuit 14.

Apart from the heretofore described CPU0 6 and CPU1 6, inspection circuits 11 and 11, and CPU bus synchronization inspection circuit 13, the resynchronization timer and timeout control circuit 16 (a timer/maximum time comparison circuit 161), reset control register 18, resynchronization control register 19, changeover switch 17, and error indication register 20 are connected to the switching/resynchronization control circuit 14.

Of these, the changeover switch 17 carries out a switching between the CPU bus0 7 and the CPU bus1 7 in accordance with an instruction from the switching/resynchronization control circuit 14. By the changeover switch 17 carrying out the switching between the CPU bus0 7 and the sCPU bus1 7, it is decided, for example, through which of the CPU bus0 7 and CPU bus1 7 the issued command is to be input into the global address crossbar 3.

The reset control register 18 is a register which manages the condition of each CPU0 6 and CPU1 6 for a reset control over each CPU0 6 and CPU1 6. For example, on a saving of cache data of a normal CPU0 6 or a normal CPU1 6 to the memory 12 being completed in the redundant CPU resynchronization process, a saving completion flag corresponding to the normal CPU is put up in the reset control register 18 by the normal CPU's of the CPU0 6 or the CPU1 6 control (the normal CPU interrupt firm process) based on the firmware stored in the firmware hub 15 (S106 and S110).

The resynchronization control register 19 is a register in which are set the number of resynchronization process executions for the two CPUs of the CPU0 6 and the CPU1 6, an upper limit thereof (a resynchronization possible upper limit), and a resynchronization possibility flag. The resynchronization possible upper limit is set by the system control/management device 5 operated by the system manager, via the command decoder 21. Also, the resynchronization possibility flag is a flag which indicates whether or not it is possible to resynchronize the two CPUs of the CPU0 6 and the CPU1 6. Then, a normal CPU0 6 or a normal CPU1 6 operating in accordance with the firmware stored in the firmware hub 15, as well as recording an actual number of resynchronization process executions in the resynchronization control register 19 (S308), compares it with the resynchronization possible upper limit set in the resynchronization control register 19 (S306 and S307). In the event that the number of executions is less than the resynchronization possible upper limit, the CPU0 6 or the CPU1 6 determines that it is possible to further retry the resynchronization process, and sets, for example, a flag 1 as the resynchronization possibility flag in the resynchronization control register 19 (S308) but, in the event that the number of executions reaches the resynchronization possible upper limit, it determines that it is impossible to further retry the resynchronization process, and sets, for example, a flag 0 as the resynchronization possibility flag (S309).

The error indication register 20 is a register which stores information on various kinds of fault detected by the north bridge 6 (the switching/resynchronization control circuit 14, and resynchronization timer and timeout control circuit 16 (timer/maximum timer comparison circuit 161)). For example, in the event that the switching/resynchronization control circuit 14 has received each heretofore described error notification, error contents notified of are stored in the error indication register 20. Also, an ID of an abnormal CPU bus0 7 or an abnormal CPU bus1 7 in which a synchronization delay has occurred is stored in the error indication register 20. Furthermore, in the event that the number of resynchronization process executions has reached the upper limit, or in the event that a resynchronization period has reached an upper limit, a synchronization impossible flag (corresponding to synchronization delay information) is stored in the error indication register 20 acting as a synchronization delay information holder.

A CPU0 6 or a CPU1 6 which executes the reset firmware initial setting process based on the firmware stored in the firmware hub 15, based on whether or not the synchronization impossible flag is set in the error indication register 20 after a start-up, executes the resynchronization process (in the event that the synchronization impossible flag is not set: in and after S302), or starts independently (in the event that the synchronization impossible flag is set: in and after S310). Then, it is also acceptable to notify the system manager of fault information by, for example, acquiring other error information stored in the error indication register 20, and notifying the system control/management device 5 of the information.

The resynchronization timer and timeout control circuit 16 is a circuit which compares a resynchronization maximum time set by the system control/management device 5 via the command decoder 21 and time for the resynchronization. In the event that the time exceeds the resynchronization maximum time, the resynchronization timer and timeout control circuit 16 requests the switching/resynchronization control circuit 14 to activate only a normal CPUs of the normal CPU0 6 or the normal CPU1 6 and a normal CPU buses of the normal CPU bus0 7 or the normal CPU bus1 7, and execute a reset.

Figure 3:
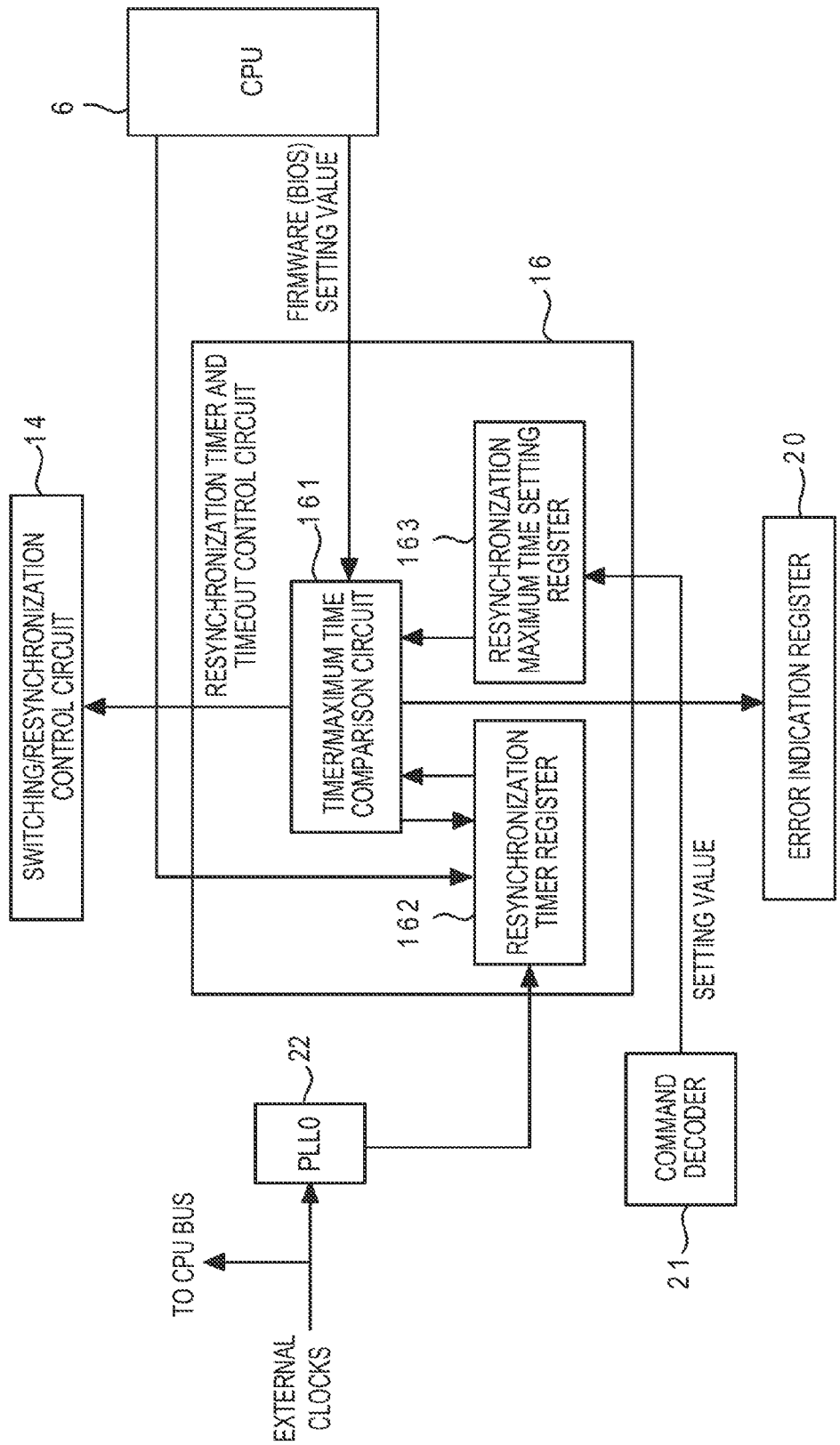
FIG. 3 is a block diagram depicting an internal configuration of a resynchronization timer and timeout control circuit.

The resynchronization timer and timeout control circuit 16 is configured of the resynchronization maximum time setting register 163, a resynchronization timer register 162, and the timer/maximum time comparison circuit 161, as depicted in FIG. 3.

A resynchronization process time upper limit (a timeout time) is set in the resynchronization maximum time setting register 163 (corresponding to a timeout time holder) by the system control/management apparatus 5 operated by the system manager, via the command decoder 21.

The resynchronization timer register 162 (corresponding to a counter) measures a resynchronization time by counting up register values (corresponding to count information) using the clocks (the first clocks) supplied from the phase synchronization circuit (PLL0) 22. In this way, as clocks from the phase synchronization circuit (PLL0) 22 are used which are of a system differing from that of CPU clocks, it is possible to measure the time without depending upon a condition of each CPU0 6 and CPU1 6, and it does not happen either that the register values are cleared due to a reset for a resynchronization. With the resynchronization timer register 162, as well as it being cleared to zero, its counting-up is started (S101) and stopped (S107 and S305) by the normal CPU's of the CPU0 6 or the CPU1 6 controls (the normal CPU interrupt firm process and firmware initial process) based on the firmware stored in the firmware hub 15, and in addition, is stopped by the timer/maximum time comparison circuit 161 too (S501).

The timer/maximum time comparison circuit 161 (corresponding to a comparator) compares a value of the resynchronization maximum time setting register 163 and a value of the resynchronization timer register 162 and, in the event that the two values match, as well as clearing the resynchronization timer register 162 to zero, and stopping the counting-up (S501), puts up the synchronization impossible flag in the error indication register 20 (S502), and requests the switching/resynchronization control circuit 14 to activate only a normal CPU 6 and normal CPU bus 7, and implement a reset (S503).

The switching/resynchronization control circuit 14 is a circuit which, by receiving an error notification from each CPU0 6 and CPU1 6, each inspection circuit 11 and 11, or the CPU bus synchronization inspection circuit 13, subjects both, or a normal one, of the two CPUs of the CPU0 6 and the CPU1 6 to a CPU reset or interrupt, controls the operation of the changeover switch 17, and sets a flag in the error indication register 20.

Specifically, the switching/resynchronization control circuit 14, in the event of receiving the error notification, by setting the clock control circuit 23 in such a way as to stop a supply of clocks to a CPU bus0 7 or a CPU bus1 7 to which is connected a CPU0 6 or a CPU1 6 in which an error has occurred, deactivates the CPU bus0 7 or the CPU bus1 7 (S002) and, as well as stopping a command issue from the CPU bus0 7 or the CPU bus1 7 to the global address crossbar 3, records which CPU bus0 7 or CPU bus1 7 has deactivated in the error indication register 20.

Also, the switching/resynchronization control circuit 14, being triggered by receiving the error notification, notifies a normal CPU0 6 or a normal CPU1 6 connected to a normal CPU bus0 7 or a normal CPU bus1 7 of the interrupt (S003). As a result, the normal CPU0 6 or the normal CPU1 6 executes the "normal CPU interrupt firm process" depicted in FIGS. 4 and 5, as heretofore described. That is, a processor (a CPU0 6 or a CPU1 6) in which no synchronization delay has occurred is initialized.

Also, the switching/resynchronization control circuit 14, on monitoring the reset control register 18 and resynchronization control register 19, and confirming that the saving completion flag is set up for the normal CPU0 6 or the normal CPU1 6, issues a reset to each CPU0 6 and CPU1 6 in the event that the resynchronization possibility flag=1 is set up (S202). The switching/resynchronization control circuit 14 puts up the synchronization impossible flag in the error indication register 20 in the event that the resynchronization possibility flag=0 is set up (S401) and, as well as referring to the ID of the deactivated CPU bus0 7 or CPU bus1 7 stored in the error indication register 20, and causing an abnormal CPU0 6 or an abnormal CPU1 6 side clock control circuit 23 to stop a supply of clocks to the CPU bus0 7 or the CPU bus1 7 (S402), issues a reset only to the normal CPU0 6 or the normal CPU1 6 (S403), and compels the changeover switch 17 to switch to the normal CPU0 6 or the normal CPU1 6 side (S404). The CPU0 6 or the CPU1 6 to which such a reset has been issued executes the initial process (the "reset firmware initial process" depicted in FIGS. 4A and 4B), as heretofore described.

Also, the switching/resynchronization control circuit 14, on being requested by the timer/maximum time comparison circuit 161 to activate only a normal CPU 6 and normal CPU bus 7, and implement a reset, as well as referring to the record of the deactivated CPU bus0 7 or CPU bus1 7 stored in the error indication register 20, and causing an abnormal CPU0 6 or an abnormal CPU1 6 side clock control circuit 23 to stop a supply of clocks to the CPU bus0 7 or the CPU bus1 7 (S503), issues the reset only to the normal CPU0 6 or the normal CPU1 6 (S504), and compels the changeover switch 17 to switch to the normal CPU0 6 or the normal CPU1 6 side (S505).

The heretofore described CPUs of the CPU0 6 and the CPU1 6, firmware hub 15, CPU bus synchronization inspection circuit 13, and switching/resynchronization control circuit 14 correspond to a synchronization controller which, by comparing an output from the first processor (the CPU0 6) and an output from the second processor (the CPU1 6), monitors a synchronization between the first and second processors (a function of the CPU bus synchronization inspection circuit 13). In the event that the outputs from the first processor and second processor do not match, the synchronization controller initializes the counter, and causes the counter to start a counting (functions of the switching/resynchronization control circuit 14, CPU0 6 and CPU1 6, and firmware hub 15). Furthermore, when the comparator detects that the count information and timeout time match, the synchronization controller stops either the first or second processor in which a synchronization delay has occurred (a function of the switching/resynchronization control circuit 14).

Resynchronization Process

Next, a description will be given, based on the flowcharts of FIGS. 4 to 6, of an operational sequence of the north bridge 6, and a flow of a process executed by a CPU0 6 or a CPU1 6 based on the firmware stored in the firmware hub 15. In each of these drawings, an α column indicates the operational sequence of the north bridge 6, and a β column indicates the flow of the process executed by the CPU0 6 or the CPU1 6 based on the firmware.

Figure 4A:
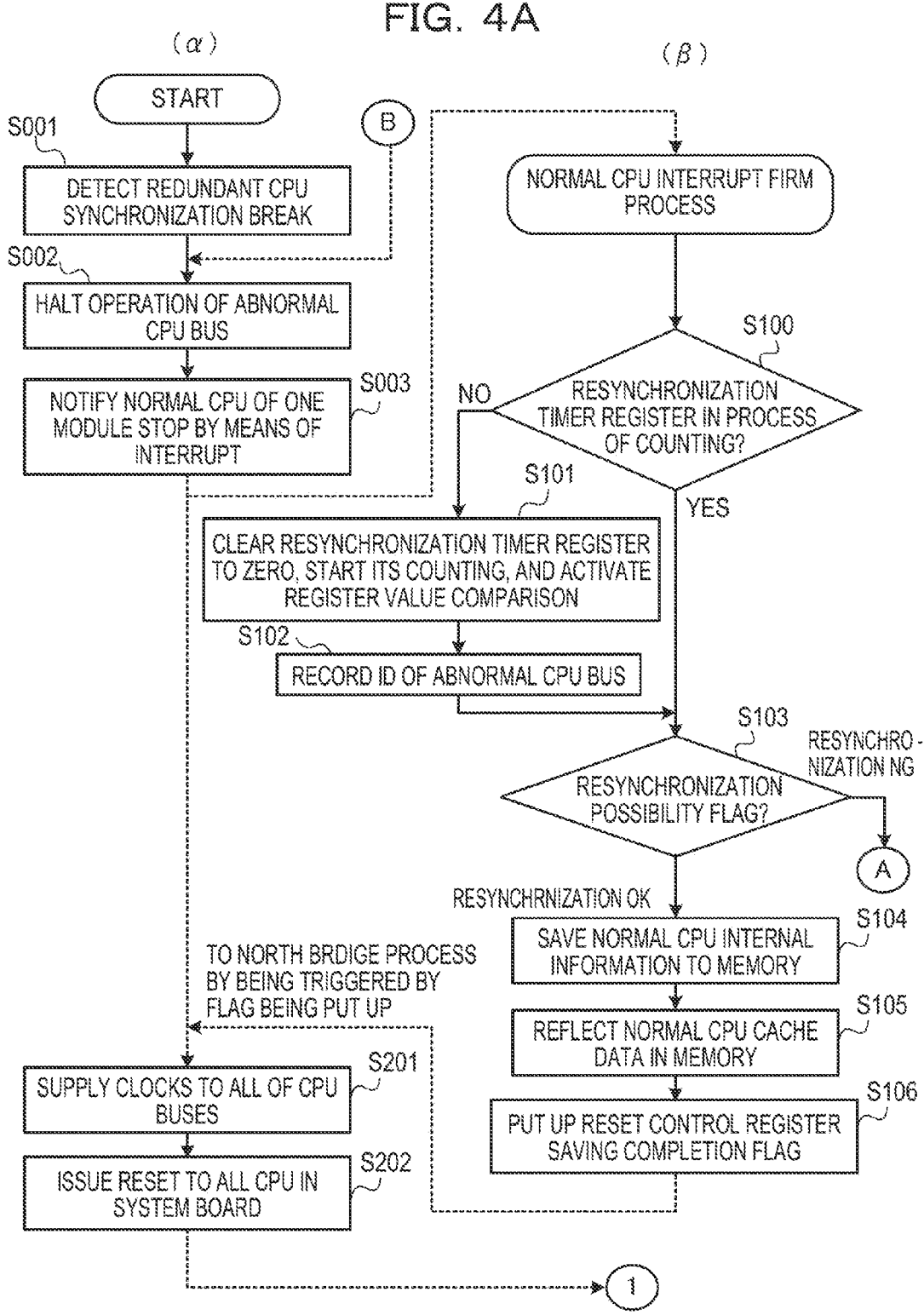
FIGS. 4A and 4B are flowcharts depicting details of a resynchronization process.
Figure 4B:
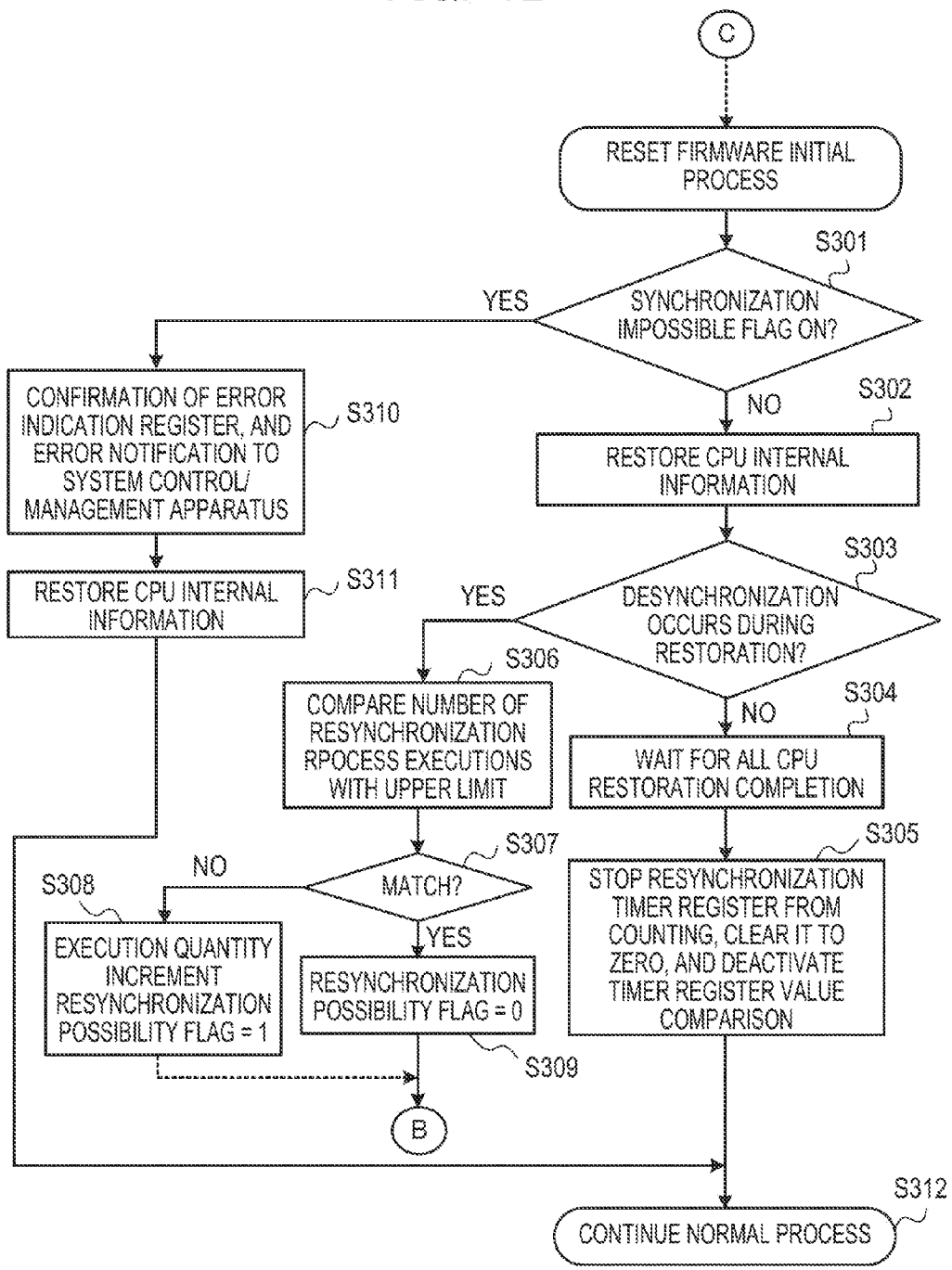

Firstly, the switching/resynchronization control circuit 14, by powering on a main power supply, starts the operation in a of FIGS. 4A and 4B and, in a first S001, based on an error notification from each CPU0 6 and CPU1 6, each inspection circuit 11 and 11, or the CPU bus synchronization inspection circuit 13, monitors a synchronization delay of either CPU 6, that is, a redundant CPU synchronization break.

Then, the switching/resynchronization control circuit 14, on detecting the redundant CPU synchronization break, causes the process to proceed from S001 to S002. The switching/resynchronization control circuit 14 stops the α operation by stopping a supply of clocks to a CPU bus0 7 or a CPU bus1 7 (hereafter referred to as an "abnormal CPU bus 7") to which is connected a CPU0 6 or a CPU1 6 (hereafter referred to as an "abnormal CPU 6) in which a synchronization delay has occurred.

In the next S003, the switching/resynchronization control circuit 14 gives an interrupt notification that the abnormal CPU 6 is stopped, that is, of a "one module stop", to a CPU0 6 or a CPU 1 6 (hereafter referred to as a "normal CPU 6") connected to a CPU bus0 7 or a CPU bus1 7 (hereafter referred to as a "normal CPU bus 7") on a side whose operation is not stopped.

Then, the normal CPU 6 which has received the interrupt notification reads the firmware stored in the firmware hub 15, and starts the normal CPU interrupt firm process depicted in β of FIGS. 4A and 4B. Then, the normal CPU 6, in a first S100 after the start, confirms a condition of the resynchronization timer register 162. Then, in the event that the resynchronization timer register 162 is in the middle of a timer counting, the normal CPU 6 causes the process to proceed directly to S103 and, in the event that the resynchronization timer register 162 has been stopped, and a timer counting has not yet been started, causes the process to proceed to S101

In S101, the normal CPU 6, as well as starting a counting-up after once clearing the resynchronization timer register 162 to zero, causes the timer/maximum timer comparison circuit 14 to start comparing a count value of the resynchronization timer register 162 and a value of the resynchronization upper limit setting register 163.

In the next S102, the normal CPU 6 records the ID of the CPU bus 7 whose operation has been stopped in S002 in the error indication register 20. On completing S102, the normal CPU 6 causes the process to proceed to S103.

In S103, the normal CPU 6 refers to the resynchronization possibility flag set in the resynchronization control register 19, and determines whether or not it is possible to implement a redundant CPU resynchronization. Then, the normal CPU 6, in the event of determining that it is possible to implement the redundant CPU resynchronization because a value indicating that the resynchronization is possible (the flag 1 in the heretofore described example) is set, causes the process to proceed to S104. As opposed to this, the normal CPU 6, in the event of determining that it is not possible to implement the redundant CPU resynchronization (NG) because a value indicating that the resynchronization is impossible (the flag 0 in the heretofore described example) is set, causes the process to proceed to S107, continuing the operation using one module (the normal CPU bus).

In S104, the normal CPU 6 saves (copies) the internal information (which, being the contents of a register in the CPU and the like, includes an address immediately before a synchronization break) to the memory 12. However, in the event that the resynchronization process is being retried (in the event that the process is looped after S309 or S308, to be described hereafter, is executed), as the internal information is already saved to the memory 12, no more saving to the memory is carried out.

In the next S105, the normal CPUs of the CPU0 6 or the CPU1 6 reflects (cache flashes), in the memory, the cache data held inside the normal CPU 6. On a saving of the cache data to the memory being completed, the normal CPUs of the CPU0 6 or the CPU1 6 causes the process to proceed to S106.

In S106, the normal CPU 6 sets a saving completion flag corresponding to the normal CPU 6 in the reset control register 18. Subsequently, the normal CPU interrupt firm process executed by the normal CPU goes on standby (goes into an infinite loop).

Meanwhile, the switching/resynchronization control circuit 14 starts by being triggered by the saving completion flag being set in the reset control register 18. The switching/resynchronization control circuit 14 carries out the operation in and after S201 in a of FIGS. 4A and 4B on condition that the resynchronization possibility flag with the value indicating that the resynchronization is impossible (the flag 0 in the heretofore described example) is not set in the resynchronization control register 19. In the event that the resynchronization possibility flag with the value indicating that the resynchronization is impossible (the flag 0 in the heretofore described example) is set in the resynchronization control register 19, the switching/resynchronization control circuit 14 carries out the operation in and after S401 depicted in a of FIG. 5.

In S201, the switching/resynchronization control circuit 14 sets the clock control circuits 23 and 23 in such a way as to supply clocks to both CPU bus0 7 and CPU bus1 7.

In the next S202, the switching/resynchronization control circuit 14 issues a reset to each CPU0 6 and CPU1 6 in the system board 1. With the reset, the contents in the memory are held as they are.

Each CPU0 6 and CPU1 6 reset as a result of the reset issue in S202 reads the firmware stored in the firmware hub 15, and starts the reset firmware process depicted in β of FIGS. 4A and 4B. Then, in a first S301 after the start, the CPU 6 checks whether or not the synchronization impossible flag is set in the error indication register 20. Then, if the synchronization impossible flag is set, the CPU 6 causes the process to proceed to S310, but if the synchronization impossible flag is not set, the CPU 6 causes the process to proceed to S302. In the event that the switching/resynchronization control circuit 14 issues a reset by executing S202, the synchronization impossible flag is not set, meaning that the process in and after S302 is executed. The process in and after S310 will be described after a description of FIG. 5 is given, as a matter of convenience.

In S302, the CPU 6 starts a restoration of the internal information of the normal CPU saved to the memory 12. Even in the event that a CPU 6 which is a processing subject is the abnormal CPU 6 connected to the abnormal CPU bus 7, as the restoration is carried out using the internal information of the normal CPU 6, it is possible to restore a redundant component with the normal CPU 6.

In the next S303, the CPU 6, by confirming the record of the error indication register 20, checks whether or not there is a desynchronization after the start of the CPU internal information restoration process in S302. Then, if there is a desynchronization, the CPU 6 causes the process to proceed to S306, while if the CPU internal information restoration process is completed without any desynchronization, it causes the process to proceed to S304.

In S306, the CPU 6 compares the number of resynchronization process executions set in the resynchronization control register 19 and the resynchronization possible upper limit. Then, if the number of executions has reached the resynchronization possible upper limit (S307: yes), the CPU 6 determines that it is impossible to further retry the resynchronization process and, in S309, sets the value indicating that the resynchronization is impossible (for example, the flag 0) in the resynchronization control register 19. As opposed to this, if the number of executions is still less than the resynchronization possible upper limit (S307: no), the CPU 6 determines that it is possible to retry the resynchronization process and, in S308, as well as incrementing one of values of the number of executions recorded in the resynchronization control register 19, sets the value indicating that the resynchronization is possible (for example, the flag 1) in the resynchronization control register 19. Then, in either case, the CPU 6 notifies the switching/resynchronization control circuit 14 that it can execute the operation in and after S002 again.

Meanwhile, in S304, the CPU 6 waits for the internal information restoration by means of S302 to be completed in the other CPU 6 which is one of the pair of redundant CPU's. Then, on the CPU internal information restoration process being completed in the other CPU 6 too, both CPU's are restored to the addresses immediately before the synchronization break, so the CPU 6 causes the process to proceed to S305.

In S305, the CPU 6 deactivates the comparison of the timer/maximum timer comparison circuit 161, stops the timer counting of the resynchronization timer register 162, and clears the register value thereof to zero. On completing S305, the CPU 6 can restart a normal process in the redundant CPU (S312).

Next, a description will be given, referring to FIG. 5, of the process in and after S107 executed in the event that it is determined in S103 that the resynchronization is impossible.

In S107, the CPU 6 deactivates the comparison of the timer/maximum time comparison circuit 161, stops the timer counting of the resynchronization timer register 162, and clears the register value thereof to zero.

In the next S108, the CPU 6 saves (copies) the internal information of the normal CPU 6 (which, being a register in the CPU and the like, includes the address immediately before the synchronization break) to the memory 12. However, in the event that the resynchronization process is being retried, as the internal information is already saved to the memory 12, no more saving to the memory is carried out.

In the next S109, the normal CPU 6 reflects (cache flashes), in the memory, the cache data held inside the normal CPU 6. On a saving of the cache data to the memory 12 being completed, the normal CPU 6 causes the process to proceed to S110.

In S110, the normal CPU 6 sets a saving completion flag corresponding to the normal CPU 6 in the reset control register 18. Subsequently, the normal CPU interrupt firm process executed by the normal CPU goes on standby (goes into an infinite loop).

Meanwhile, the switching/resynchronization control circuit 14 starts by being triggered by the saving completion flag being set in the reset control register 18, and carries out the operation in and after S401 in a of FIG. 5 on condition that the resynchronization possibility flag with the value indicating that the resynchronization is impossible (the flag 0 in the heretofore described example) is set in the resynchronization control register 19.

In S401, the switching/resynchronization control circuit 14 sets the synchronization impossible flag in the error indication register 20.

In the next S402, the switching/resynchronization control circuit 14, in order to cut off a clock control over an abnormal bus 7 indicated by the ID of an abnormal CPU bus 7 recorded in the error indication register 20, sets a clock control circuit 23 connected to the abnormal bus 7, and thereby degenerates the abnormal bus 7.

Continuing, the switching/resynchronization control circuit 14, as well as issuing a reset only to a normal CPU 6 (that is, a CPU 6 connected to a CPU bus 7 which is not the abnormal CPU bus 7 indicated by the ID recorded in the error indication register 20, that is, to a normal CPU bus 7) in S403, fixes the changeover switch 17 to the normal CPU bus 7 side in S404.

In this reset, in a condition in which a supply of clocks to the abnormal CPU bus 7 and abnormal CPU 6 is stopped, only the normal CPU 6 and normal CPU bus 7 start to operate again. That is, the reset normal CPU 6 reads the firmware stored in the firmware hub 15, and starts the reset firmware process depicted in β of FIGS. 4A and 4B. Then, in the first S301 after the start, the CPU 6 checks whether or not the synchronization impossible flag is set in the error indication register 20, but as the synchronization impossible flag is set in this case, the process in and after S310 is executed.

In S310, the normal CPU 6 refers to the error indication register 20, and notifies the system control/management apparatus 5 of the contents of errors set.

In the next S311, the normal CPU 6 starts restoring the internal information of the normal CPU 6 saved to the memory 12. On this restoration process being completed, the normal CPU 6 can restart the normal process in an independent operation (S312).

As heretofore described, while the switching/resynchronization control circuit 14 is operating, and each CPU 6 is executing the process in accordance with the firmware, too, the timer/maximum timer comparison circuit 161 caused to start the comparison in S101, unless the comparison is deactivated in S107, continues to compare the count value of the resynchronization timer register 162 and the value of the resynchronization upper limit setting register 163. Then, on detecting that the former has reached the latter, the timer/maximum time comparison circuit 161 notifies the switching/resynchronization control circuit 14 of that fact. The switching/resynchronization control circuit 14 which has received this notification starts the operation depicted in FIG. 6 by means of an interrupt. In the event that there is this interrupt, the switching/resynchronization control circuit 14, in a first S501, deactivates the comparison of the timer/maximum time comparison circuit 161, stops the timer count of the resynchronization timer register 162, and clears the register value thereof to zero.

In the next S502, the switching/resynchronization control circuit 14 sets the synchronization impossible flag in the error indication register 20.

In the next S503, the switching/resynchronization control circuit 14, in order to cut off a clock control over an abnormal bus 7 indicated by the ID of an abnormal CPU bus 7 recorded in the error indication register 20, sets a clock control circuit 23 connected to the abnormal bus 7, and thereby degenerates the abnormal bus 7.

Continuing, the switching/resynchronization control circuit 14, as well as issuing a reset only to a normal CPU 6 (that is, a CPU 6 connected to a CPU bus 7 which is not the abnormal CPU bus 7 indicated by the ID recorded in the error indication register 20, that is, to a normal CPU bus 7) in S504, fixes the changeover switch 17 to the normal CPU bus 7 side in S505.

In this reset, in the condition in which a supply of clocks to the abnormal CPU bus 7 and abnormal CPU 6 is stopped, only the normal CPU 6 and normal CPU bus 7 start to operate again. That is, the reset normal CPU 6 reads the firmware stored in the firmware hub 15, and starts the reset firmware process depicted in β of FIGS. 4A and 4B. Then, in the first S301 after the start, the CPU 6 checks whether or not the synchronization impossible flag is set in the error indication register 20, but as the synchronization impossible flag is set in this case, the process in and after S310 is executed.

In S310, the normal CPU 6 refers to the error indication register 20, and notifies the system control/management apparatus 5 of the contents of errors set.

In the next S311, the normal CPU 6 starts restoring the internal information of the normal CPU 6 saved to the memory 12. On this restoration process being completed, the normal CPU 6 can restart the normal process in an independent operation (S312).

According to the server system configured in the way heretofore described, as a synchronization delay has occurred in one of the two CPU0 6 and CPU1 6 configuring the redundant CPU's, a resynchronization process has been tried but, in the event that a desynchronization has occurred halfway through the resynchronization process, the resynchronization process is retried. However, even in the event that the resynchronization process is repeated over and over again because the synchronization delay has a serious cause, time elapsing from the resynchronization being started is measured by the resynchronization timer register 162. On it being detected by the timer/maximum time comparison circuit 161 that the elapse of time has reached the resynchronization process time upper limit recorded in the resynchronization maximum time setting register 163, clocks to an abnormal CPU bus connected to the abnormal CPU in which the synchronization delay has occurred are discontinued, after which only a normal CPU in which no synchronization delay has occurred is reset. Therefore, as an early restart of the normal process is achieved by an independent operation of the normal CPU, it is possible to avoid a disadvantage such that the normal process is stopped over a long period.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A synchronization control apparatus connected to a first processor and a second processor, comprising:
   a counter that carries out a counting and outputs resulting count information;
   a timeout time holder that holds a predetermined timeout time and outputs the timeout time;
   a comparator that compares the count information output from the counter and the timeout time output from the timeout time holder;
   a synchronization controller that monitors a synchronization between the first processor and the second processor by comparing an output from the first processor and an output from the second processor and starts the counting when a mis-match of the outputs from the first processor and the second processor is detected;
   wherein the comparator detects that the count information and the timeout time match, the comparator stops either the first processor or second processor in which a synchronization delay has occurred, and wherein the comparator detects that the count information and the timeout time match after the counter starts the counting, the synchronization control apparatus initializes one of the first processor and the second processor in which the synchronization delay has not occurred and stops the comparison between the output from the first processor and the output from the second processor.

2. The synchronization control apparatus according to claim 1, further comprising:

a synchronization delay information holder, wherein if the comparator detects that the count information and the timeout time match after the counter starts the counting, the synchronization control apparatus stores synchronization delay information in the synchronization delay information holder.

3. The synchronization control apparatus according to claim 1, wherein the counter carries out the counting based on first clocks input into the synchronization control apparatus from the exterior.

4. An information processing apparatus having a first processor, a second processor, and synchronization control apparatus connected to the first and second processors, the synchronization control apparatus comprising:

a counter that carries out a counting and outputs resulting count information;

a timeout time holder that holds a predetermined timeout time and outputs the timeout time;

a comparator that compares the count information output from the counter and the timeout time output from the timeout time holder;

a synchronization controller that monitors a synchronization between the first processor and the second processor by comparing an output from the first processor and an output from the second processor and starts the counting when a mis-match of the outputs from the first processor and the second processor is detected;

wherein the comparator detects that the count information and timeout time match, the comparator stops either the first processor or second processor in which a synchronization delay has occurred, and wherein if the comparator detects that the count information and timeout time match after the counter starts the counting, the synchronization control apparatus initializes one of the first processor and the second processor in which the synchronization delay has not occurred and stops the comparison between the output from the first processor and the output from the second processor.

5. The information processing apparatus according to claim 4, wherein the synchronization control apparatus further comprises:

a synchronization delay information holder, wherein if the comparator detects that the count information and timeout time match after the counter starts the counting, the synchronization control apparatus stores synchronization delay information in the synchronization delay information holder.

6. The information processing apparatus according to claim 4, wherein the counter carries out the counting based on first clocks input into the synchronization control apparatus from the exterior.

7. A synchronization management method for managing synchronization between a first processor and a second processor by a synchronization control apparatus connected to the first and second processors, the method comprising:

comparing an output from the first processor and an output from the second processor to monitor the synchronization between the first processor and the second processor;

starting a counting, when a mis-match of the outputs from the first processor and the second processor is detected;

comparing count information with a given timeout time after starting the counting;

stopping either the first processor or the second processor in which a synchronization delay has occurred; and initializing one of the first processor and the second processor in which the synchronization delay has not occurred and stops the comparison between the output from the first processor and the output from the second processor, wherein the time match between the count information and the timeout time is detected after the counting starts, and wherein the comparator detects that the count information and timeout time match.

* * * * *